US 6,229,914 B1

(12) United States Patent
Hiraishi et al.

(10) Patent No.: US 6,229,914 B1
(45) Date of Patent: May 8, 2001

(54) IMAGE PROCESSING METHOD AND IMAGE INPUT DEVICE, CONTROL DEVICE, IMAGE OUTPUT DEVICE AND IMAGE PROCESSING SYSTEM EMPLOYING SAME

(75) Inventors: Junji Hiraishi; Tetsuya Miwa; Hitoshi Nakamura; Kiyoshi Imai; Kouichi Ohmae; Shinya Sonoda; Souichi Matsushita; Minoru Inada, all of Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/519,356

(22) Filed: Mar. 6, 2000

Related U.S. Application Data

(63) Continuation of application No. 08/672,998, filed on Jul. 1, 1996, now Pat. No. 6,052,479.

(30) Foreign Application Priority Data

Jun. 30, 1995 (JP) .................................................. P7-187907

(51) Int. Cl.[7] ...................................................... G06K 9/00
(52) U.S. Cl. ........................... 382/162; 382/165; 382/217
(58) Field of Search .................................. 382/162, 165, 382/112, 135, 137, 209, 217, 218, 219, 181; 358/501, 523, 524, 530, 538; 356/71

(56) References Cited

U.S. PATENT DOCUMENTS

| 5,604,596 | 2/1997 | Ukai et al. . |
| 6,128,401 | * 10/2000 | Suzuki et al. ........................ 382/135 |

FOREIGN PATENT DOCUMENTS

| 0506 469 A2 | 9/1992 | (EP) . |
| 0522 769 A1 | 1/1993 | (EP) . |
| 0637 165 A1 | 2/1995 | (EP) . |
| 2277 223 A1 | 2/1994 | (GB) . |

* cited by examiner

*Primary Examiner*—Phuoc Tran
(74) *Attorney, Agent, or Firm*—Dickstein Shapiro Morin & Oshinsky LLP

(57) ABSTRACT

To reliably and simply prevent the output of specified image data, a unit to detect a pattern is installed in one of the devices in a system consisting of an image scanner 1, control device 2 (a personal computer) and printer 3 which are connected consecutively. This pattern detection unit contains a unit which detects a specified pattern from the mass of image data representing a document. Once this pattern has been found, either the subsequent image data are altered before being output or output of the image data is interrupted. When the system starts up, the control unit for each device checks whether that device, or one of the other devices in the system, has a pattern detection unit as described above. If it determines that no device has such a unit, it halts operation.

11 Claims, 17 Drawing Sheets

IMAGE PROCESSING METHOD AND IMAGE INPUT DEVICE, CONTROL DEVICE, IMAGE OUTPUT DEVICE AND IMAGE PROCESSING SYSTEM EMPLOYING SAME

This application is a continuation of application Ser. No. 08/672,998, filed on Jul. 1, 1996, now U.S. Pat. No. 6,052,479, which is hereby incorporated by reference.

FIELD OF THE INVENTION

The invention relates to an image processing method by which image data representing a 2-dimensional object are input and subjected to specified processing, and the processed image data are output. The invention also relates to an image input device, a control device, an image output device and an image processing system in which this method is employed.

BACKGROUND OF THE INVENTION

In recent years, copy machines have been developed which can read a document, such as a color photograph, and generate a high-quality copy in which the colors are accurately reproduced. Such copy machines are now used for a wide variety of applications.

However, the resolution of these copy machines is high enough that someone might think it worthwhile to try to run off multiple copies of bank notes, stock certificates, or other documents which may not be legally reproduced. To prevent such one-touch counterfeiting, it has been suggested (Patent Publication 2-210481) that copy machines should be given the capability of recognizing a characteristic pattern on non-reproducible documents so that copies of such documents will not be output.

FIG. 28 shows the general configuration of a device to provide the capability to prevent copying described above. It consists primarily of image generation unit 50, control unit 51, image formation unit 52 and pattern detection unit 53.

The aforesaid image generation unit 50 consists of an image scanner which reads the document and generates red (R), blue (B) and green (G) image data. Control unit 51 inputs these image data and converts them to yellow (Y), magenta (M), cyan (C) and black (K) image data which can be used in image formation unit 52. Image formation unit 52 accepts the converted image data and transcribes them.

Pattern detection unit 53 determines whether the image data generated by image generation unit 50 contain the characteristic pattern which identifies a non-reproducible document. The result of this determination is output to control unit 51. When control unit 51 receives from unit 53 the result that the characteristic pattern has been found, it outputs a control signal (shown in the drawing by dotted lines) to image formation unit 52 or image generation unit 50 to cease operating. With this method, the generation or output of image data identified by the characteristic pattern will be interrupted, and the copying operation will be halted or the entire surface of the copy which is output will be covered with a particular color.

Recently, printers have been developed which are capable of outputting highly accurate color images. Now anyone with an image scanner, a personal computer and a printer can easily make reproductions of color documents which are as accurate as those of high-resolution copy machines. For this reason a demand has sprung up for a device which could be installed in such a system to prevent the reproduction of specified image data and thereby prevent the system from being used for unlawful copying.

SUMMARY OF THE INVENTION

The present invention addresses the problems discussed above. One objective is to provide a device which would be able to recognize a characteristic pattern in a document's image data and control the output of image data based on the result of this recognition. This would be a simple and reliable way to prevent the output of specified image data.

Another objective of this invention is to provide a device able to determine whether there is a means either in the system or connected to it which could detect specific image data as described above and control the output of image data. If it is determined that there is no such device, it would partially or completely halt the function of the system so that output of the specific image data would be completely arrested.

In one embodiment of the present invention, the image data to be processed are color image data consisting of the combination of image data associated with a number of color signals which are input successively.

In another embodiment of the present invention, the specified pattern is detected as follows. For each color signal, all image data except those which will be input last are stored separately. When the final data are input, an image created by combining these data with all the aforesaid image data which have been stored is compared with a reference pattern.

In still another embodiment of the present invention, the method is implemented by a device which detects a specified pattern. This device consists of: a device to store separately all image data for each color signal except those data which are to be input last; a device to compare with a reference pattern an image created by combining, when the last image data have been input, the final input data with all the image data stored in the aforesaid storage device; and a device to determine, based on the result of the comparison performed by the aforesaid comparison device, whether the aforesaid specified pattern can be found in the image data being processed.

In another embodiment of the present invention, the image data for the different color signals are successively compared with a reference image. The result of the comparison for each color signal is stored, and the results of all the comparisons are cumulated to detect the specified pattern.

In another embodiment, the aforesaid means of detecting a specified pattern consists of: a device to compare the image data for each color signal to a specified reference pattern; a device to store for each color signal the result of the comparison performed by the aforesaid comparison device; and a device to cumulate the results of the comparisons for the different color signals which are stored in the aforesaid storage device and determine whether the aforesaid specified pattern can be found in the image data being processed.

In one embodiment of the present invention, an image processing method is employed by which image data representing a 2-dimensional object are input and subjected to specified processing, and the processed image data are output. When it becomes clear at some point during the aforesaid processing that either the processing to determine whether a specified pattern can be found in the image data or the processing to control the output of image data according to the result of the determination will not be executed, the image processing function is partially or completely halted.

Another embodiment of the present invention is a system to implement the processing method described above, consisting of: a device which detects whether the system has a means to determine whether a specified pattern can be found in the image data being processed; a device which detects whether the system has a means to control the output of image data based on the result of the determination made by the aforesaid means of detecting a specified pattern; and a device which halts the function of the system either partially or completely when the first of the aforesaid detection devices detects that the system has no means to determine whether a specified pattern can be found in the image data being processed, or when the second of the aforesaid detection devices detects that the system has no means to control its output.

Other embodiments concern devices used to input image data representing a 2-dimensional object. These input devices have a means to determine whether a specified pattern can be found in the image data being processed and a means to control the output of image data based on the result of the determination made by the means of detecting a specified pattern. The image data which are to be processed are color image data consisting of the combination of image data associated with a number of color signals which are input successively.

In one embodiment, the aforesaid means of detecting a specified pattern consists of: a device to store separately all image data for each color signal except those data which are to be input last; a device to compare with a reference pattern an image created by combining, when the last image data have been input, the final input data with all the image data stored in the aforesaid storage device; and a device to determine, based on the result of the comparison performed by the aforesaid comparison device, whether the aforesaid specified pattern can be found in the image data being processed.

In another embodiment, the aforesaid means of detecting a specified pattern consists of: a device to compare the image data for each color signal to a specified reference pattern; a device to store for each color signal the result of the comparison performed by the aforesaid comparison device; and a device to cumulate the results of the comparisons for the different color signals which are stored in the aforesaid storage device and determine whether the aforesaid specified pattern can be found in the image data being processed.

In still another embodiment, an image input device identical to that described above has, either integral to itself or in a device connected to it, a means to determine whether the system has a device which detects a specified pattern in the image data being processed and a device which controls data output based on the result of the detection made by the device to detect a specified pattern; and a means to halt the function of the device either partially or completely when the aforesaid determination device has determined that the system lacks either the aforesaid device to detect a pattern or the device to control the output.

Other embodiments concern a control device which executes specified processing on image data representing a 2-dimensional object or a device to output image data representing a 2-dimensional object.

In other embodiments of the present invention, an image created by combining the input data with image data entered previously and stored is compared with a reference pattern when the final image data are input. In this way it can be determined whether the image contains the specified pattern. This method makes it possible to execute pattern detection processing on an image created by successively combining image data for multiple color signals.

In some embodiments, the image data for the each color signal are compared with a reference image at the time they are generated. The result of the comparison for each color signal is stored, and the results of all the comparisons are cumulated to determine whether the data contain the specified pattern. This method makes it possible to execute pattern detection processing on a color image created by successively combining image data for multiple color signals.

Finally, in some embodiments of the present invention, when the function of detecting the pattern or the function of controlling the output of image data are not present, the function of the system is partially or completely halted. Thus, if someone should substitute some other device for the device which detects a pattern or controls the output, the function of that other device will be halted and it will become impossible to output image data for the document.

DETAILED DESCRIPTION OF THE INVENTION

Figure 1:
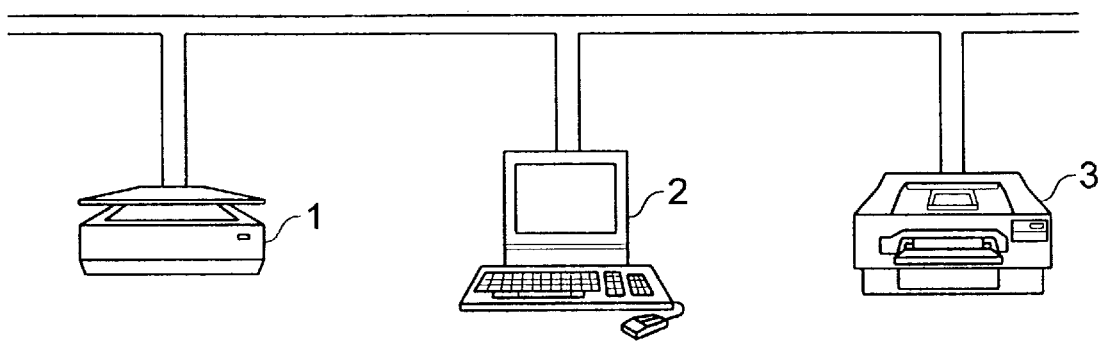
FIG. 1 illustrates the configuration of an image processing system designed according to this invention.

FIG. 1 illustrates an image processing system which is an ideal embodiment of this invention.

This image processing system consists of image scanner 1, control device 2, a personal computer, and printer 3, all of which are connected together by an SCSI bus or a LAN circuit.

Image scanner 1 can generate image data in three primary colors. The R, G and B data which are generated are output in order to control device 2. Control device 2 inputs these image data into its internal input unit, and outputs to printer 3 either RGB or YMCG image data, depending on which method it uses. The control unit in printer 3 drives the printing head or other print processing unit according to the image data it receives and copies an image of the document.

To prevent the copying of documents which have a specified mark on them, this image processing system has, in either the aforesaid scanner 1, control device 2 or printer 3, a unit which determines whether the image data being processed contain the shape of the aforesaid mark and which prevents the output of these image data to the next stage (hereafter referred to as "the image detection unit").

This detection unit is formed on a single chip. Building this chip into an existing circuit in a device will give that device the capability of detecting the aforesaid mark.

Figure 2:
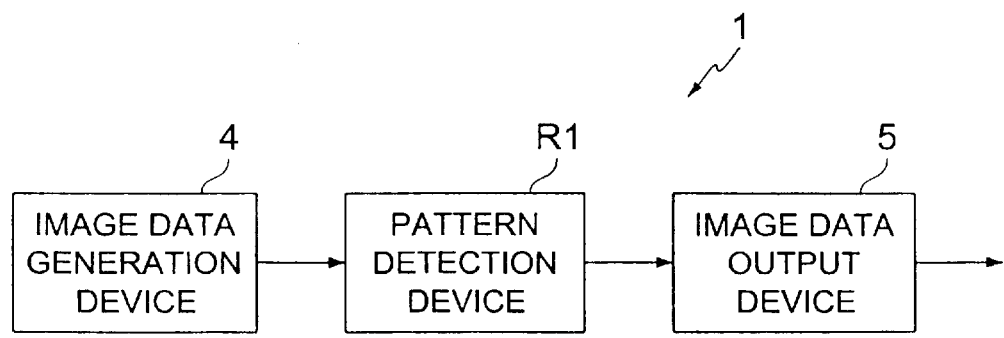
FIG. 2 is a block diagram of an image scanner in which a pattern detection unit has been installed.

If the detection unit is installed in image scanner 1, a pattern detection device $R_1$ to detect pattern must be placed between image data generation device 4 and image data output device 5, as shown in FIG. 2. Detection device $R_1$ determines whether the specified pattern can be found in the image of the document generated by image data generation device 4. If it can, the image data are converted to a specified pattern and output to data output device 5.

Figure 3:
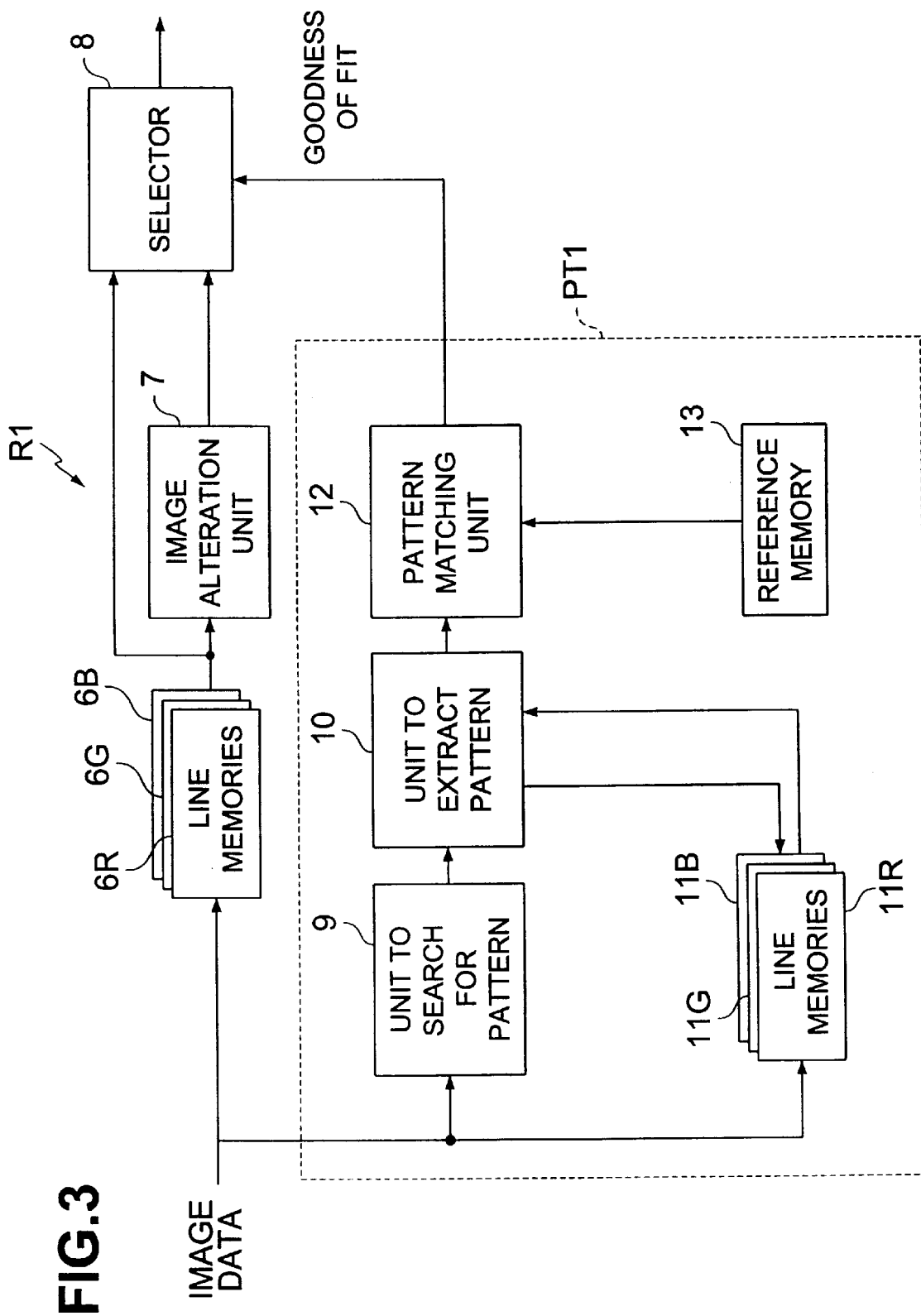
FIG. 3 is a block diagram of the pattern detection unit.

FIG. 3 shows the configuration of pattern detection device $R_1$.

Figure 4:
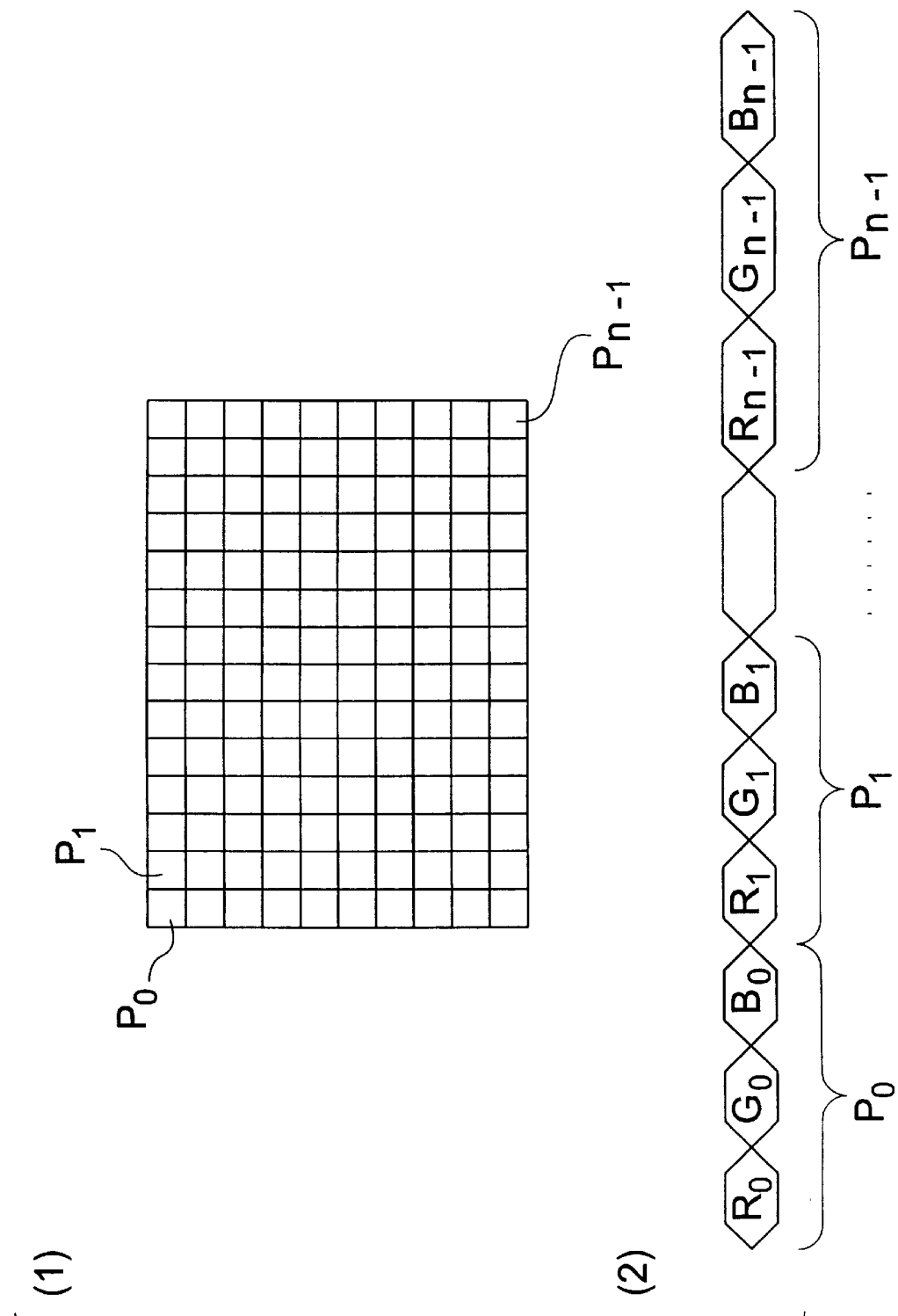
FIG. 4 illustrates how the color image data are generated.
Figure 5:
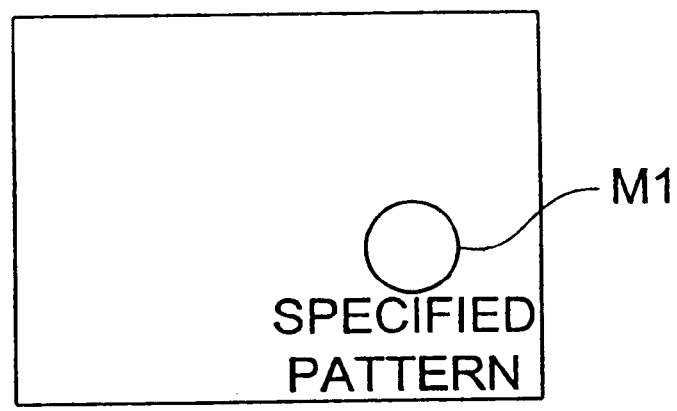
FIG. 5 shows an example of a document which may not lawfully be copied.

In this embodiment, the RGB image data for each pixel of an image consisting of n number of pixels $P_0$ through $P_{n-1}$ (shown in FIG. 4 (1)) are input successively by image data generation device 4. If a mark $M_1$ as shown in FIG. 5 is found in these image data, the document will be treated as non-reproducible.

The aforesaid detection device $R_1$ contains line memories $6_R$, $6_G$ and $6_B$, which store the image data for each color signal; image alteration unit 7; pattern detection unit $PT_1$; and selector 8.

Each of line memories $6_R$, $6_G$ and $6_B$ has a buffer which corresponds to the size of the specified pattern $M_1$. The RGB image data for each pixel are transmitted by way of line memories $6_R$, $6_G$ and $6_B$ to image alteration unit 7 and selector 8.

Image alteration unit 7 alters the image data it receives by painting over them in a specified pattern. Selector 8 selects either the original image data from line memories $6_R$, $6_G$ and $6_B$ or the altered image data and outputs them to image data output device 5.

Detection unit $PT_1$ comprises primarily of pattern search unit 9; pattern extraction unit 10; line memories $11_R$, $11_G$ and $11_B$; pattern matching unit 12; and reference memory 13. The image data for each color signal transmitted by image data generation device 4 are input into search unit 9 and line memories $11_R$, $11_G$ and $11_B$ in synchronization with their input into the line memories $6_R$, $6_G$ and $6_B$.

Figure 6:
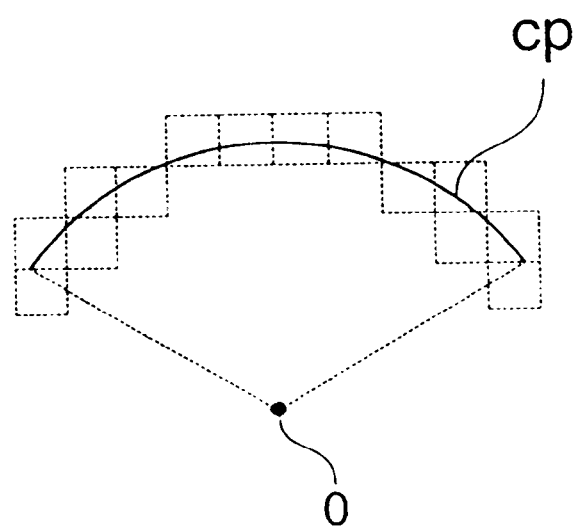
FIG. 6 illustrates the method used to search for the pattern of the mark.

Pattern search unit 9 extracts from the image data which have been input the pattern corresponding to the upper arc of the circle in the mark. As can be seen in FIG. 6, pattern search unit 9 uses the arc pattern cp which it has extracted to calculate the coordinates of the center point 0 of the entire pattern. It outputs these coordinates to pattern extraction unit 10.

Like the first set of line memories $6_R$, $6_G$ and $6_B$, line memories $11_R$, $11_G$ and $11_B$ correspond to the size of mark $M_1$. Based on the coordinates of the center point 0, pattern extraction unit 10 specifies the pixels in each of line memories $11_R$, $11_G$ and $11_B$ which correspond to the pattern of mark M and extracts the image data of each color signal which belong to that pattern. Pattern matching unit 12 calculates the correlation between the extracted pattern and a reference pattern for mark $M_1$, which is previously stored in reference memory 13. It outputs the goodness of fit which is the result of this calculation to selector 8.

Ordinarily, selector 8 selects the original image data output by line memories $6_R$, $6_G$ and $6_B$ and outputs them to image data output device 5. When matching unit 12 inputs a goodness of fit which exceeds a specified threshold value, selector 8 substitutes the altered image data from image alteration unit 7.

The alteration processing executed by image alteration unit 7 is not limited to painting over the image data in a specified way. Unit 7 might as an alternative gradually decrease the density value of the image data which are being input.

Figure 7:
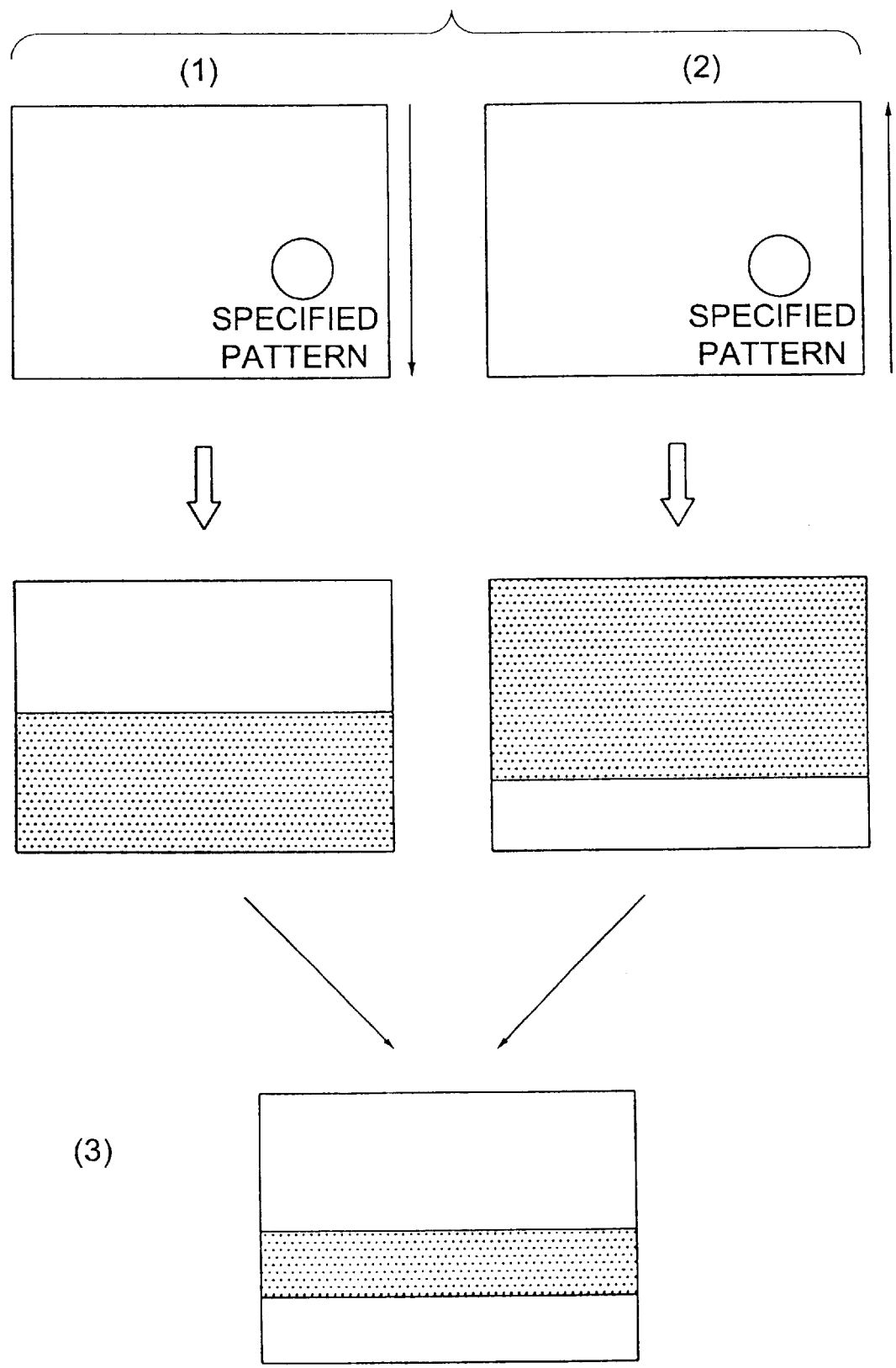
FIG. 7 shows examples of image data which are output when the pattern detection unit shown in FIG. 3 is used.

With the processing described above, as shown in FIGS. 7 (1) and (2), all of the image beyond mark $M_1$, regardless of whether the image is being scanned from top to bottom or bottom to top, is painted over before it is output. If control device 2 synthesizes the results of scanning the document from both directions, as shown in FIG. 7 (3), the portion of the image where mark $M_1$ is located will still not be reproduced.

If line memory 6 is provided with a buffer corresponding to the size of the entire image, the image data for the entire document can be altered before they are output.

Figure 8:
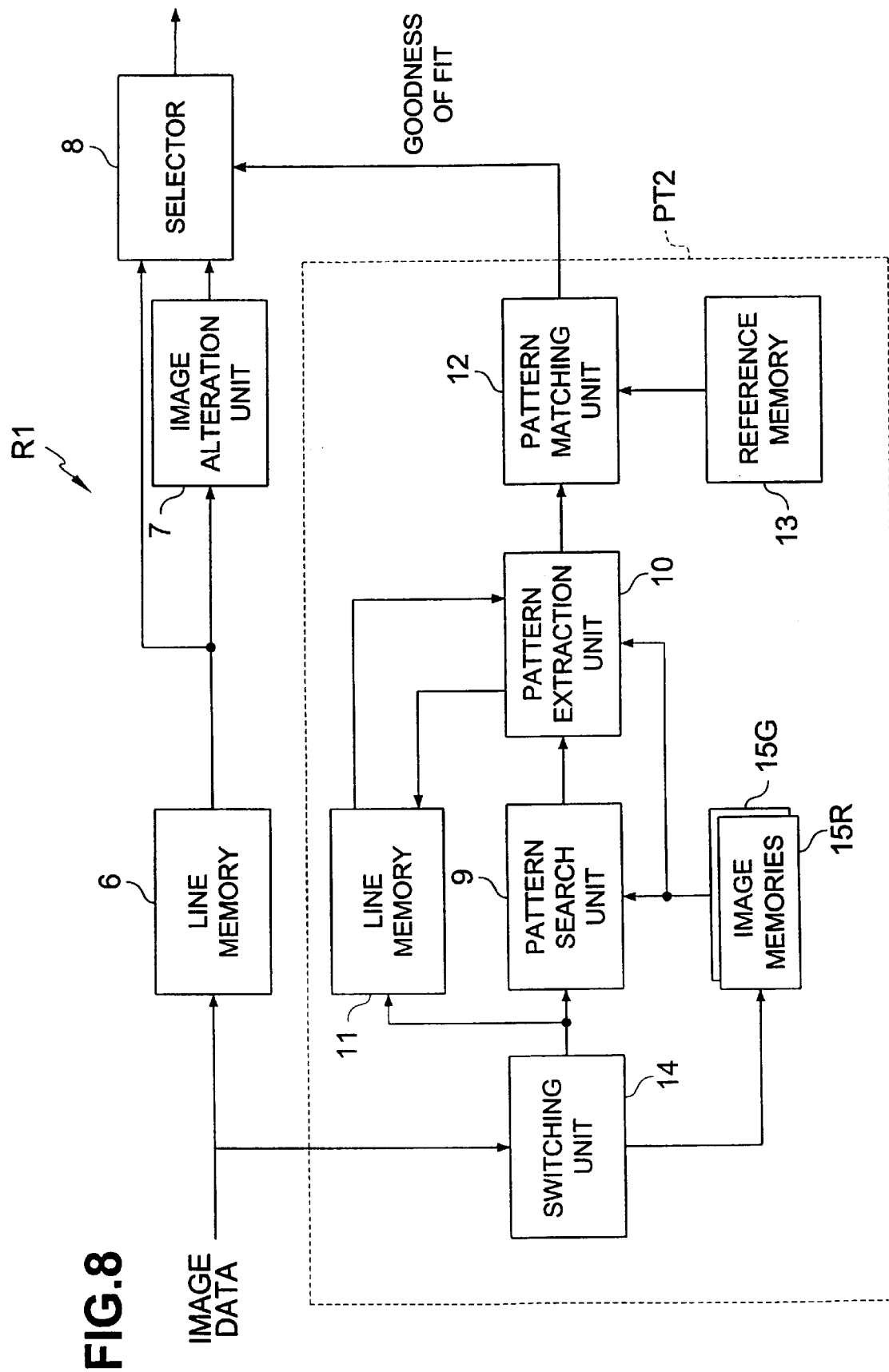
FIG. 8 is a block diagram of another pattern detection unit.

FIG. 8 shows another ideal embodiment of pattern detection device $R_1$.

Figure 9:
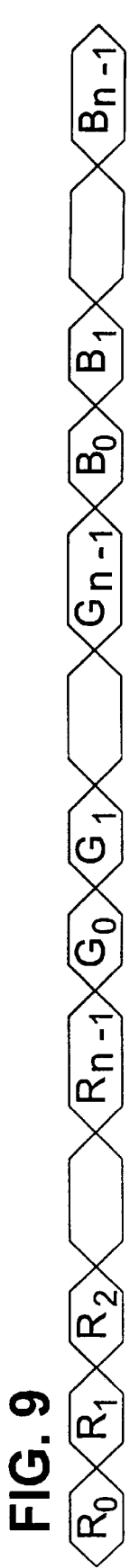
FIG. 9 shows another method to generate color image data.

In this embodiment, the image data for three primary color signals generated by image data generation device 4 are input successively as portions of the frame (shown in FIG. 9). Pattern detection unit $PT_2$ has the same configuration as detection unit $PT_1$ in FIG. 3, to which has been added switching unit 14 and line memories $15_R$ and $15_G$.

Pattern detection device $R_1$ inputs the image data for all three color signals frame unit by frame unit. This being the case, common line memories 6 and 11 store all three colors for image output and pattern detection.

The image memories $15_R$ and $15_G$ store one frame's worth of image data for each of R and G: $R_0$ through $R_{n-1}$ and $G_0$ through $G_{n-1}$. When these image data are input, switching unit 14 switches their destination between image memories $15_R$ and $15_G$.

When the B image data, $B_0$ through $B_{n-1}$, are input, switching unit 14 switches their destination between search unit 9 and line memory 11. Pattern search unit 9 combines the B data which are input with the R and G data stored in the aforesaid image memories $15_R$ and $15_G$. Executing the same processing as is described above, it extracts the center point of the pattern corresponding to mark $M_1$ and outputs these coordinates to pattern extraction unit 10.

Based on the coordinates it receives from pattern search unit 9, pattern extraction unit 10 reads out of line memory 11 and image memories $15_R$ and $15_G$ the RGB image data representing the pattern of mark $M_1$. Matching unit 12 calculates the correlation between the pattern formed by the data which are read out and a reference pattern. It outputs the goodness of fit which is the result of this calculation to selector 8.

The image data generated by image data generation device 4 are input successively into line memory 6. The original image data in line memory 6 which are associated with image data $R_0$ through $R_{n-1}$ and $G_0$ through $G_{n-1}$ are output successively by way of selector 8 and image data output device 5 to control unit 2.

When the final B image data are input, as discussed earlier, pattern detection unit $PT_2$ executes the processing to detect the pattern of mark $M_1$. When the resulting goodness of fit which is input by matching unit 12 into selector 8 exceeds a specified threshold value, selector 8 switches the output designation to the data altered by image alteration unit 7.

With this processing, once the pattern of mark $M_1$ is detected, the B image data input into control device 2 are reconformed into a specified pattern. Even if control device 2 combines these B data with the previously input R and G data, it will not be possible to reproduce an image of the document.

Figure 10:
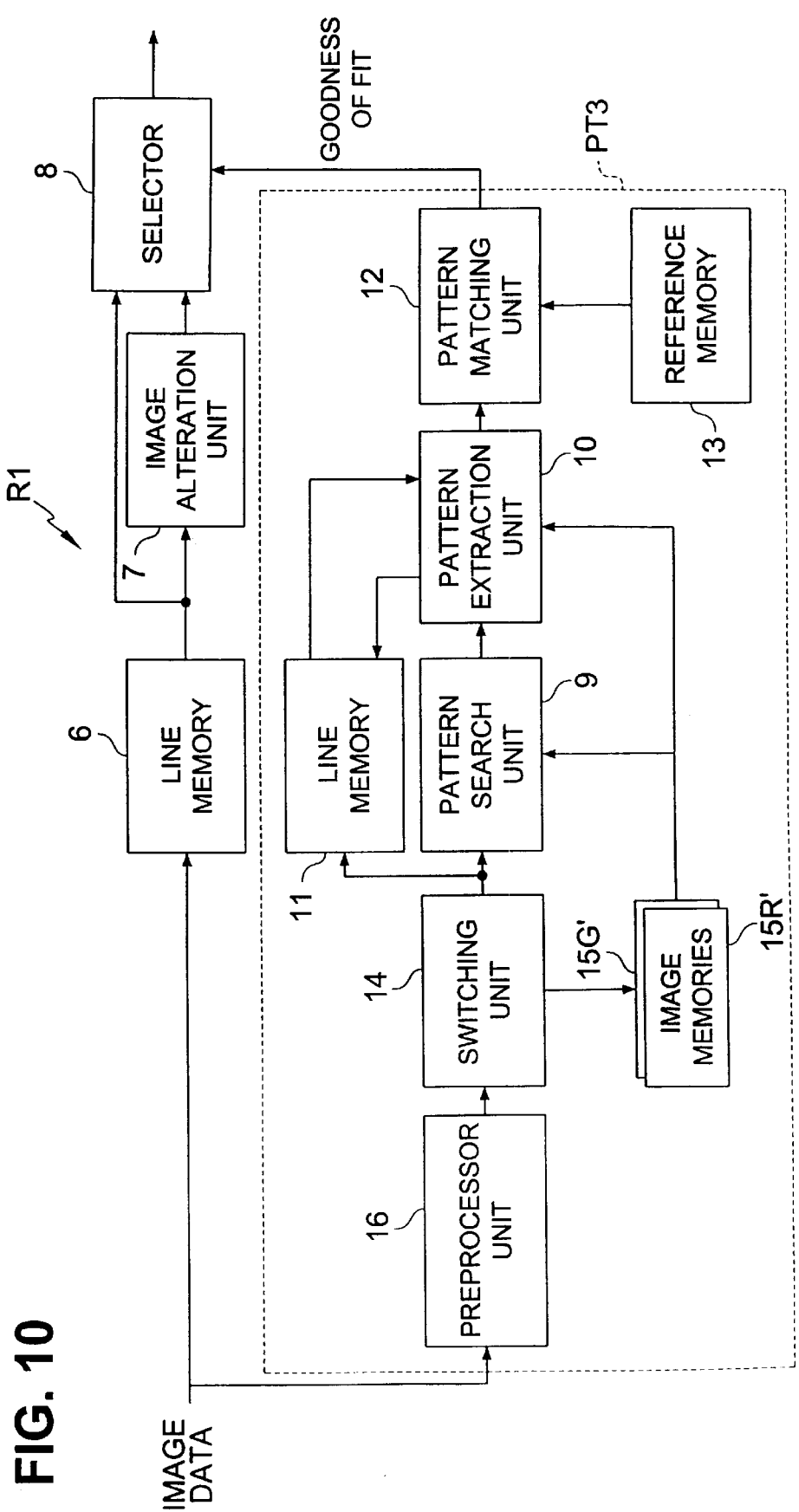
FIG. 10 is a block diagram of another pattern detection unit.

FIG. 10 shows another ideal embodiment of pattern detection device $R_1$.

This embodiment executes the same processing as the device shown in FIG. 8 above. However, as the stage prior to switching unit 14, pattern detection unit $PT_3$ has a preprocessor unit 16, which reduces the volume of data by thinning out or binarizing the image data. In place of the aforesaid image memories $15_R$ and $15_G$, $PT_3$ has image memories $15_R'$ and $15_G'$, which store the image data which have been processed by preprocessor unit 16.

Since the other components of $PT_3$ are identical to those shown in FIG. 8, they are not described again.

Figure 11:
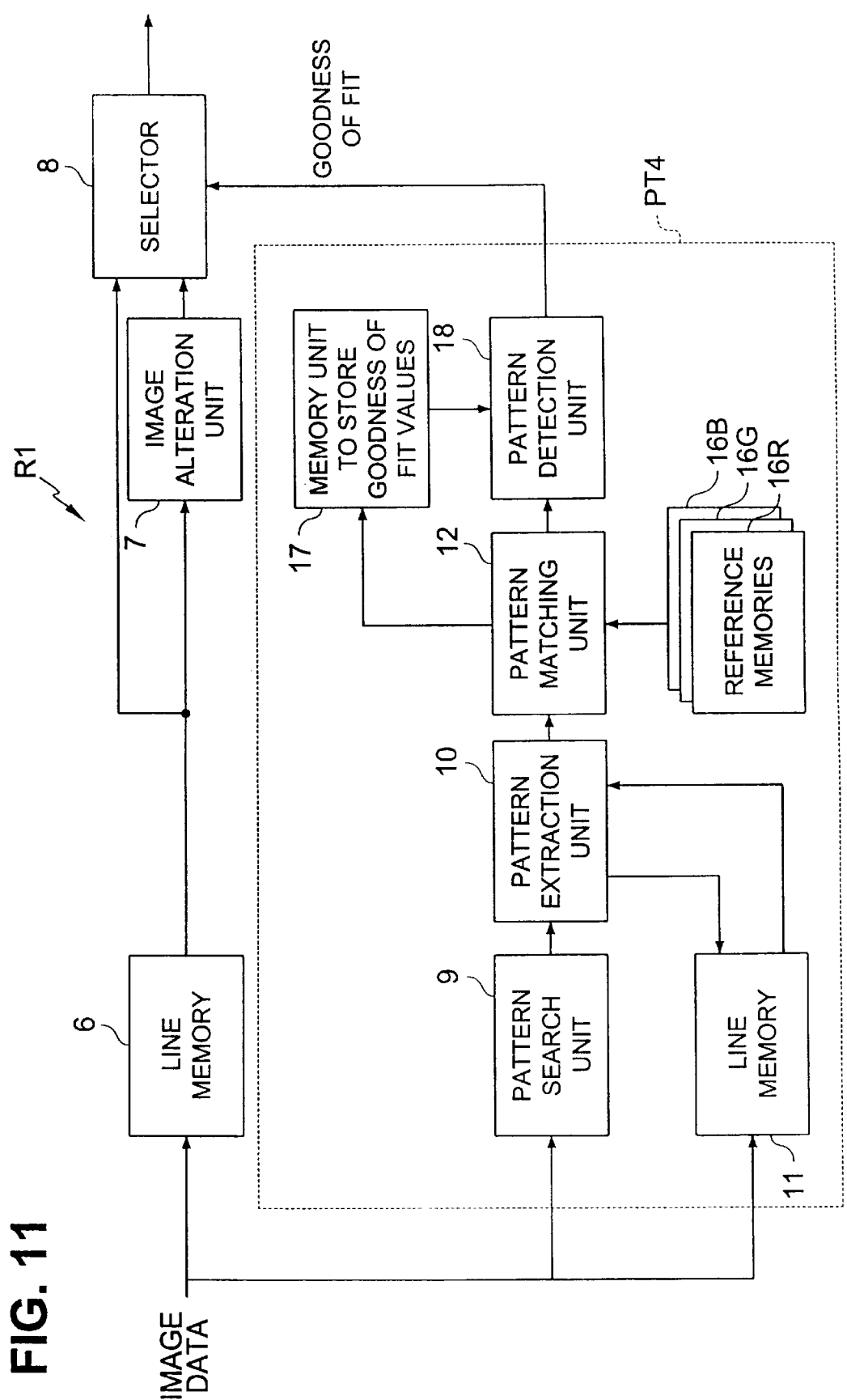
FIG. 11 is a block diagram of another pattern detection unit.

FIG. 11 shows another ideal embodiment of pattern detection device $R_1$.

This embodiment is also designed to handle image data input by image data generation device 4 according to the method shown in FIG. 9 above. Pattern detection unit $PT_4$ has the same pattern search unit 9, pattern extraction unit 10, line memory 11 and pattern matching unit 12 as described above. It has three reference memories, $16_R$, $16_G$ and $16_B$, which store reference patterns for the three color signals, a storage unit 17 for goodness of fit and a pattern detection unit 18.

Image data for the three primary colors are input successively into pattern search unit 9 and line memory 11. The patterns representing mark $M_1$ in each color signals are extracted and matched against each color signal of a reference pattern, and the goodness of fit is calculated. The goodness of fit which have been calculated are stored in storage unit 17. When the B data have been input and the final matching process is completed, pattern detection unit 18 reads out all three goodness of fit values from storage unit 17 and makes an overall determination, the result of which it outputs to selector 8.

Just as in the embodiments pictured in FIGS. 8 and 10, selector 8 selects from line memory 6 the original image data for R and G and outputs them. If, when the B data are input, a determination is input to the selector unit 8 that the pattern representing mark $M_1$ has been found, selector 8 switches the output designation to the data altered by image alteration unit 7.

With the configuration described above, if mark $M_1$ can be specified by a given color signal (red), the determination made when the image data for that signal (in this case, the R data) have been input can also be used to cause selector 8 to switch the output data.

We shall next discuss two embodiments in which the pattern detection unit is built into control device 2.

Figure 12:
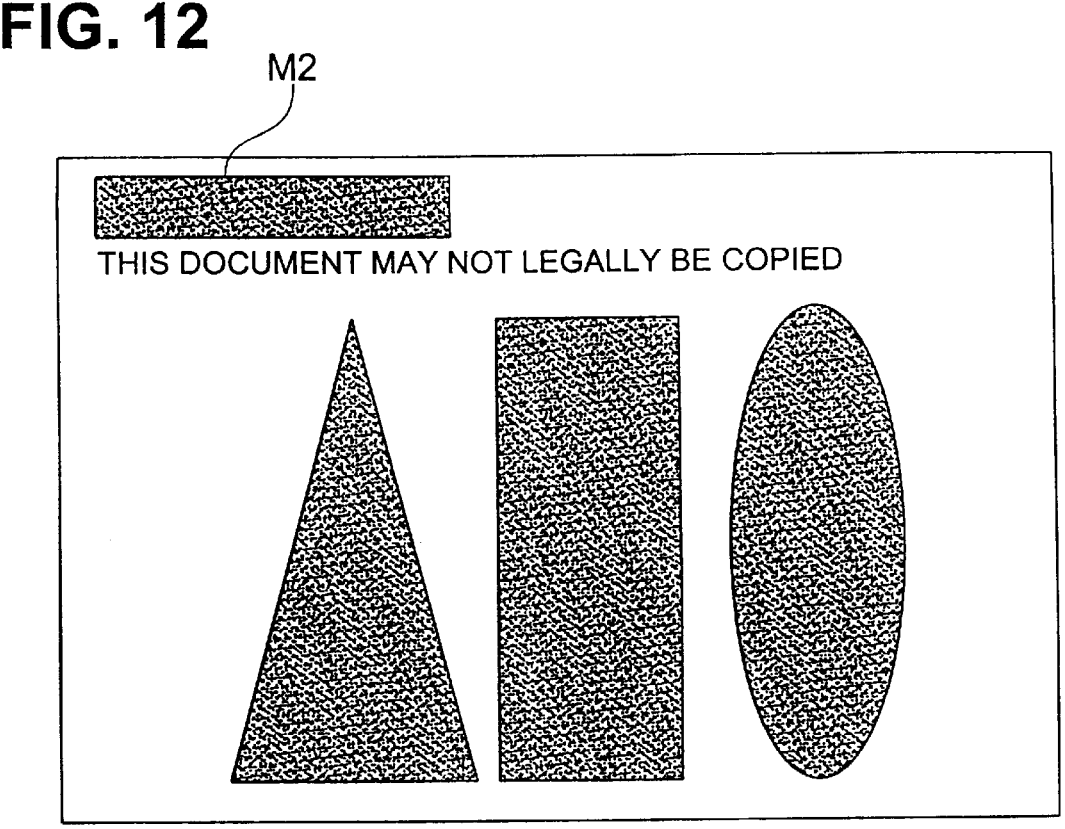
FIG. 12 is another example of a document which may not lawfully be copied.

In the following embodiments, we assume that the non-reproducible document has a mark $M_2$ like that shown in FIG. 12.

Figure 13:
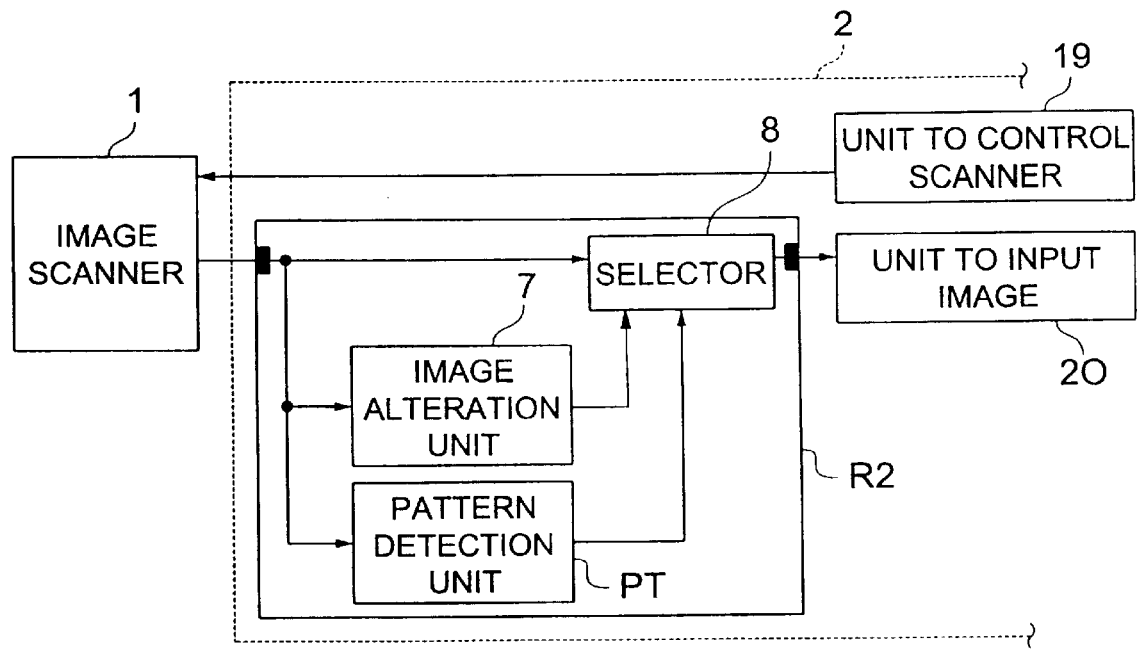
FIG. 13 is a block diagram of a control device in which a pattern detection unit is installed.
Figure 14:
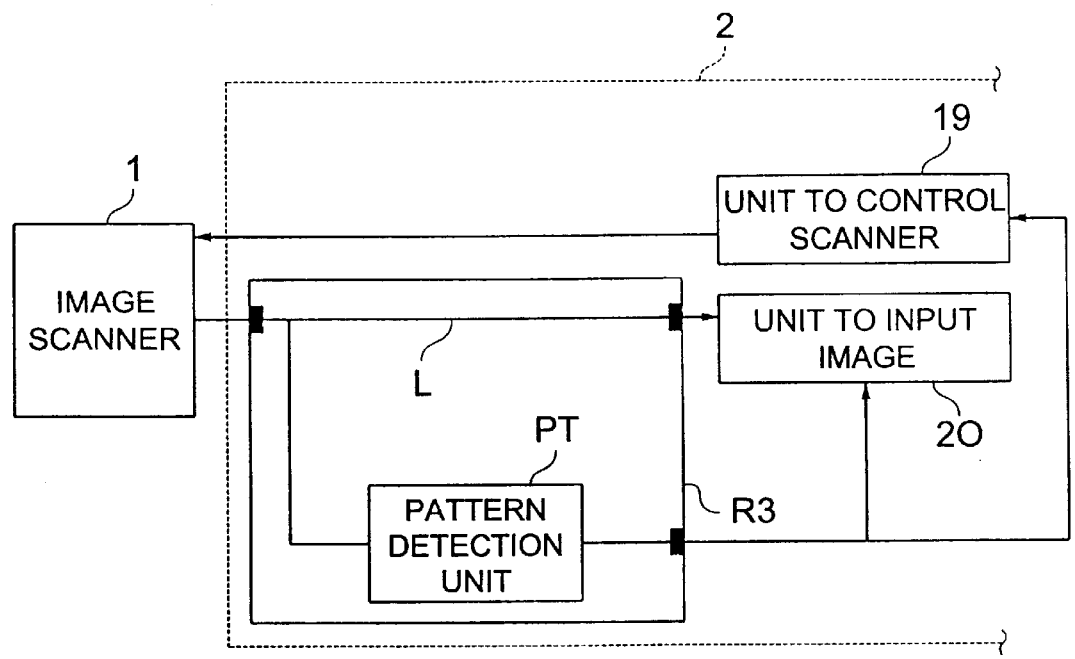
FIG. 14 is a block diagram of a control device in which a pattern detection unit is installed.

FIGS. 13 and 14 show embodiments in which detection device $R_2$ is placed on the route leading to image input unit 20 in control device 2. The pattern detection unit PT in these embodiments has the same configuration as one of units $PT_1$ through $PT_4$, depending on what method image scanner 1 uses to output its image data.

In FIG. 13, if the specified pattern is found in the image data input from image data output device 5 of image scanner 1, the image data sent to input unit 20 will be altered. Pattern detection device $R_2$ has an image alteration unit 7 and a selector 8 in addition to detection unit PT.

The image data from image scanner 1 are input simultaneously into pattern detection unit PT, image alteration unit 7 and selector 8. Detection unit PT determines, using any of the embodiments described above, whether image data input by the scanner 1 contain the specified pattern. The result of this determination is output to selector 8. Depending on the result of the determination, selector 8 selects either the original image data or the data altered by image alteration unit 7 and outputs them to image input unit 20.

FIG. 14 shows an embodiment in which pattern detection device $R_3$ halts the intake of image data by image scanner 1. In this case pattern detection device $R_3$ consists of input path L, along which the original image data from image scanner 1 are input to image input unit 20, and pattern detection unit PT. The result of the detection by unit PT is output to image input unit 20 and scanner control unit 19.

When pattern detection unit PT outputs the result that the image data input from image scanner 1 contain the specified pattern, scanner control unit 19 outputs to the intake portion of image scanner 1 a control signal to halt intake. At the same time, image input unit 20 executes processing to invalidate the image data which have been read and communicates to a control unit, not pictured, the fact that there is a defect in the reading of the image data.

In both the above embodiments, the pattern detection unit is inserted on the path along which the image data from image scanner 1 are input. However, it would also be possible to install the detection unit on the path along which the image data are output to printer 3.

Figure 15:
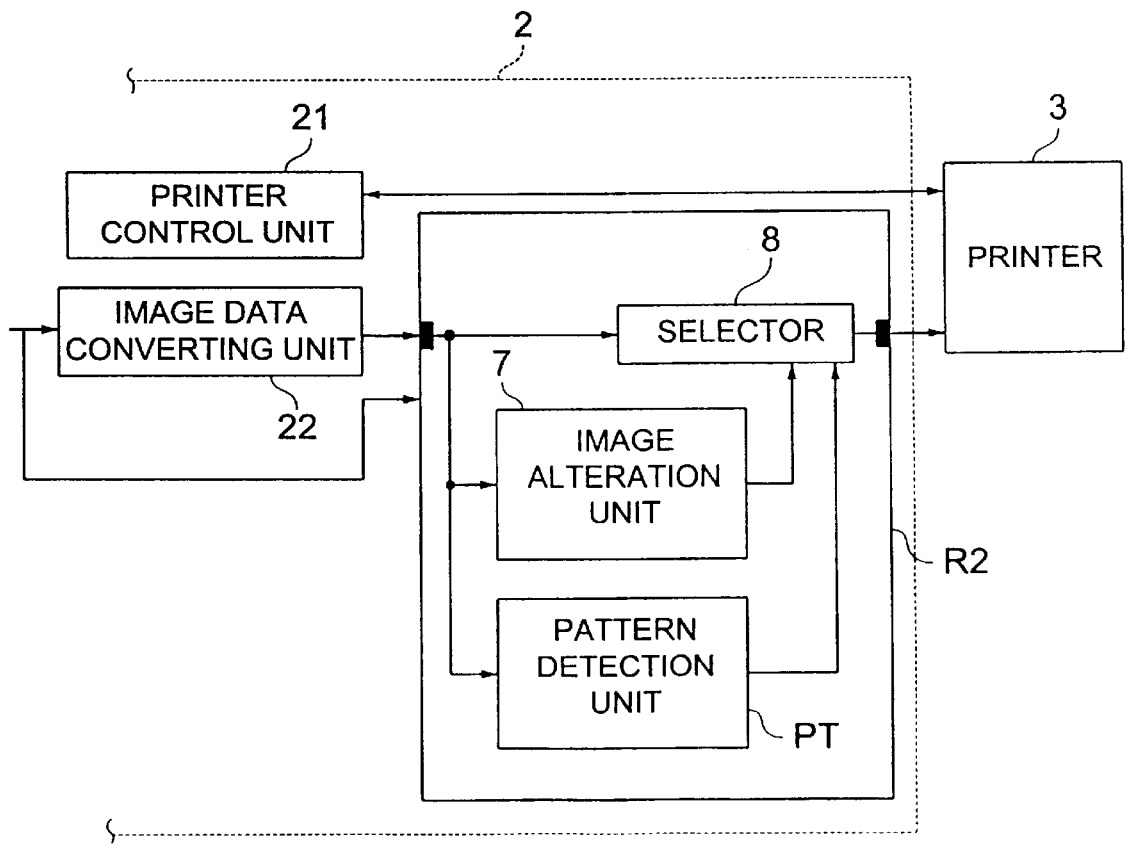
FIG. 15 is a block diagram of a control device in which a pattern detection unit is installed.

FIG. 15 has a pattern detection unit identical to that in FIG. 13 installed on the output path to printer 3. When the specified pattern is found in the image data to be output, the image data are altered before being output to printer 3. In this case, pattern detection device $R_2$ inputs and processes either the RGB image data or the YMCK image data converted by image data converting unit 22, depending on the configuration of the printer 3 to which it is connected.

Figure 16:
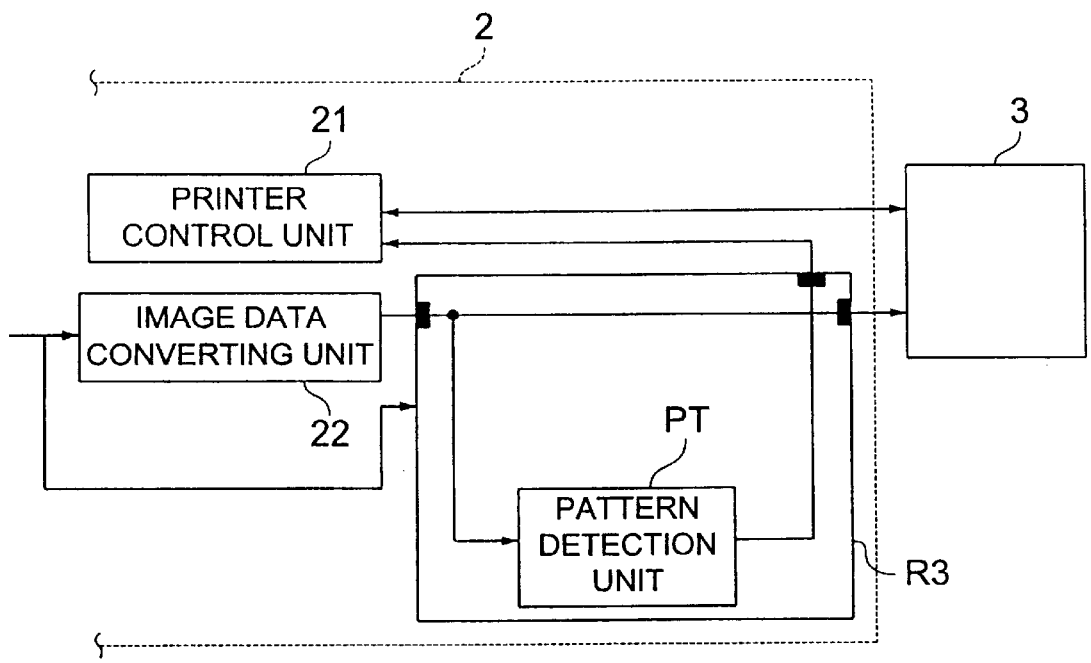
FIG. 16 is a block diagram of a control device in which a pattern detection unit is installed.

FIG. 16 has a pattern detection unit identical to that shown in FIG. 14 installed on the output path to printer 3. The result of the determination made by pattern detection unit PT is fed back to printer control unit 21. In this case, when pattern detection unit PT determines that the image data to be output contain the specified pattern, printer control unit 21 outputs a halt signal to the printer 3, and the print operation is terminated.

We shall next discuss several embodiments in which the pattern detection unit is installed in printer 3.

Figure 17:
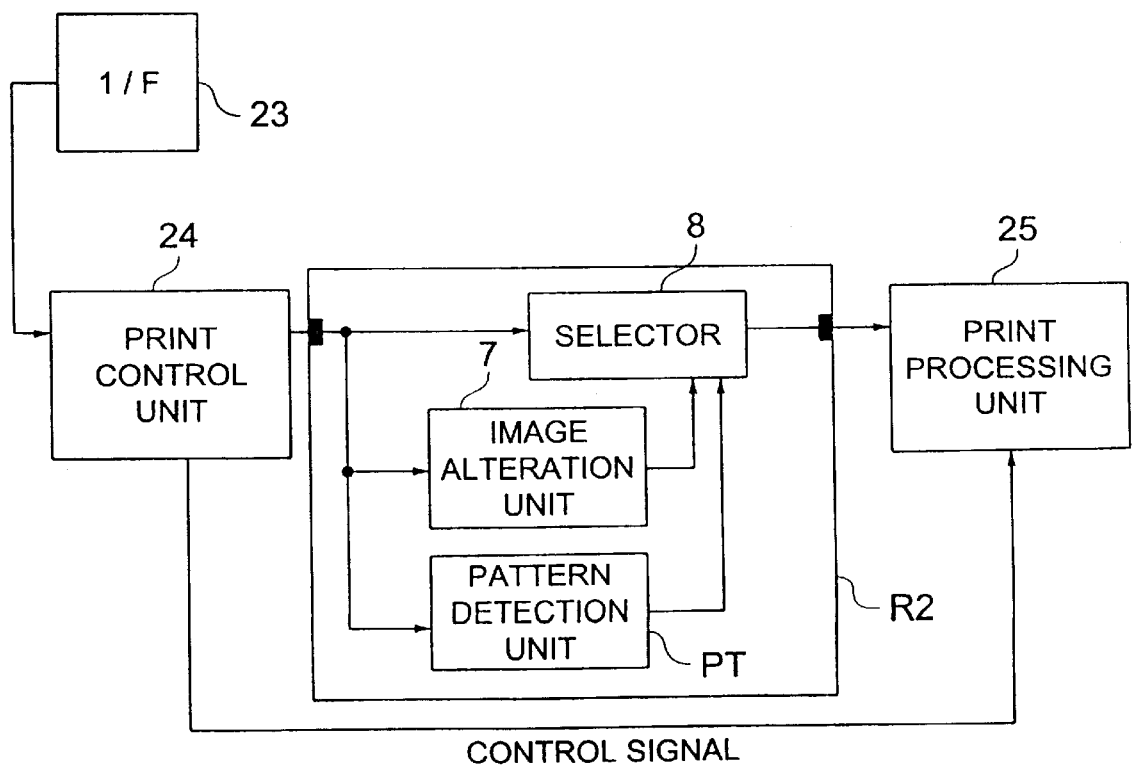
FIG. 17 is a block diagram of a printer in which a pattern detection unit is installed.

The printer 3 shown in FIG. 17 inputs the YMCK image data from control device 2 into print control unit 24 by way of interface circuit 23. Print control unit 24 transmits the image data to print processing unit 25, and controls the print operation of print processing unit 25 from start to finish. A pattern detection device $R_2$, identical to that in FIG. 13 or 15, is installed on the path along which image data are output from print control unit 24 to print processing unit 25.

Figure 18:
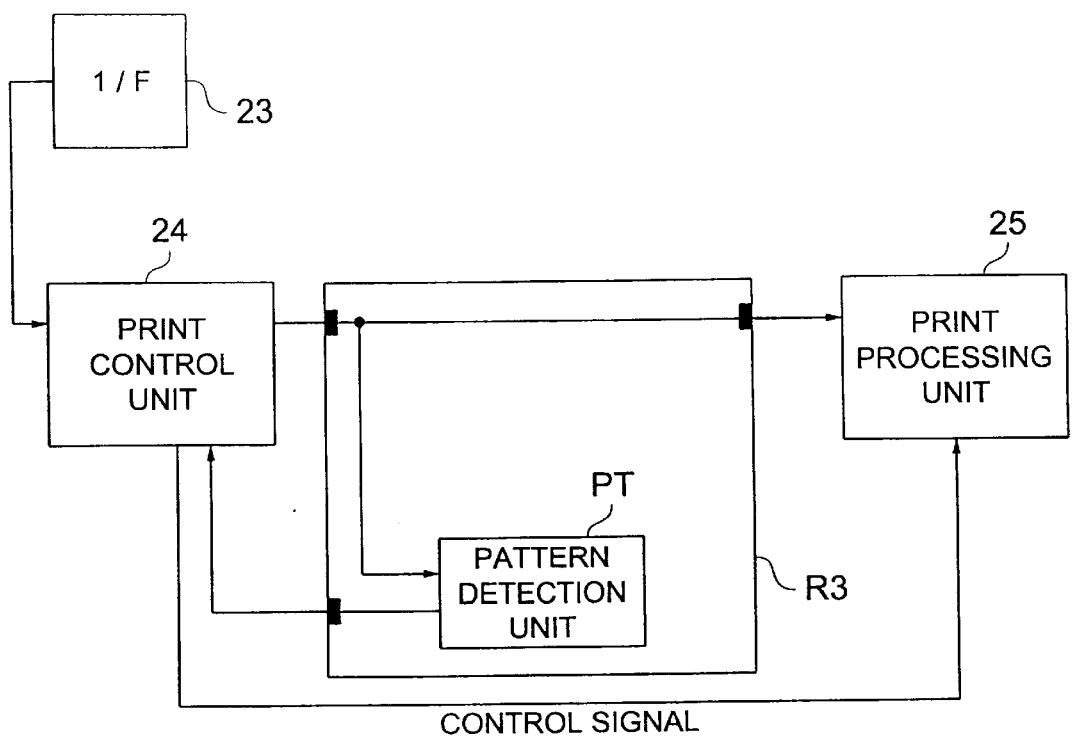
FIG. 18 is a block diagram of a printer in which a pattern detection unit is installed.

In FIG. 18, a pattern detection device $R_{31}$ identical to that in FIG. 14 or 16 above, is installed on the path along which image data are output from print control unit 24 to print processing unit 25. The result of the determination made by detection unit PT is fed back to print control unit 24. In this case, when detection unit PT determines that the image data to be output contain the specified pattern, print control unit 24 outputs a halt signal to print processing unit 25, and the print operation is interrupted.

Figure 19:
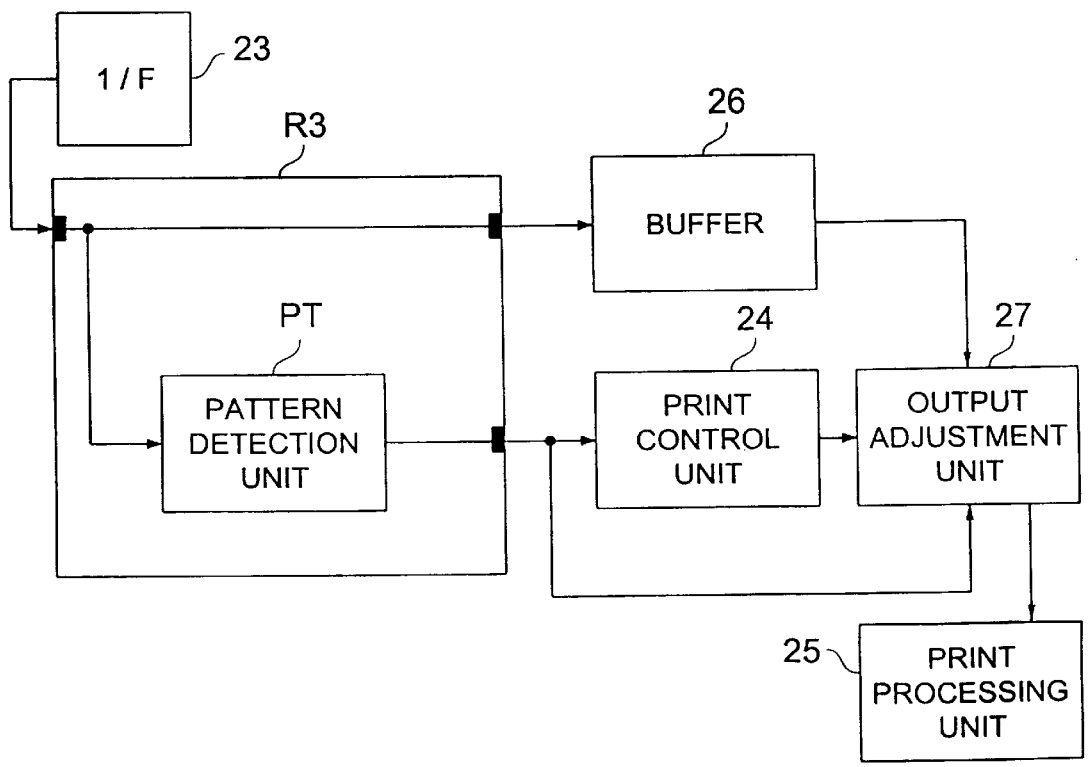
FIG. 19 is a block diagram of a printer in which a pattern detection unit is installed.

FIG. 19 shows another example of how the pattern detection unit can be incorporated in the design.

The printer in this embodiment is configured so that the image data from interface circuit 23 are input into print processing unit 25 by way of buffer 26. A pattern detection device $R_3$, identical to that in FIG. 18, is placed between interface circuit 23 and buffer 26. Output adjustment unit 27 is placed between print control unit 24 and print processing unit 25.

The image data from interface circuit 23 are input simultaneously into buffer 26 and pattern detection unit PT. Detection unit PT uses the same method described above to determine whether the image data contain the specified pattern. The result of this determination is output to print control unit 24 and output adjustment unit 27.

Ordinarily, the output adjustment unit 27 outputs the image data it receives through buffer 26 to print control unit 25 without further treatment, in response to a control signal from print control unit 24. However, when it receives a determination from the pattern detection unit that the image data to be output contain the specified pattern, it alters the image data from buffer 26. When print control unit 24 receives the same determination result, it outputs a control signal to output adjustment unit 27 to cease its operation. The operation of print processing unit 25 is immediately halted.

FIGS. 20 through 24 give five examples of the copy which is output by printer 3 in the embodiments which employ the aforesaid pattern detection device $R_2$ (FIGS. 13, 15 and 17).

Figure 20:
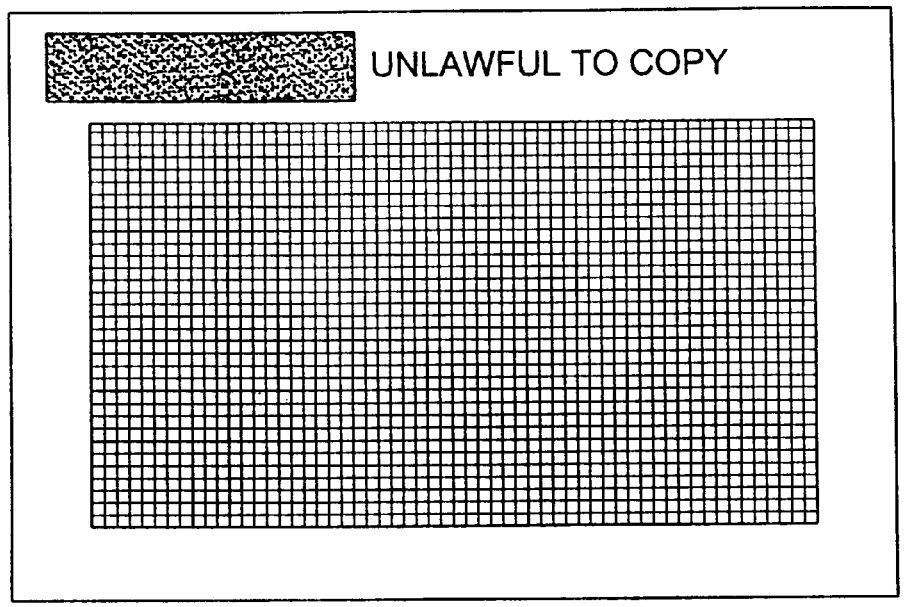
FIG. 20 gives an example of the final output of the printer.
Figure 21:
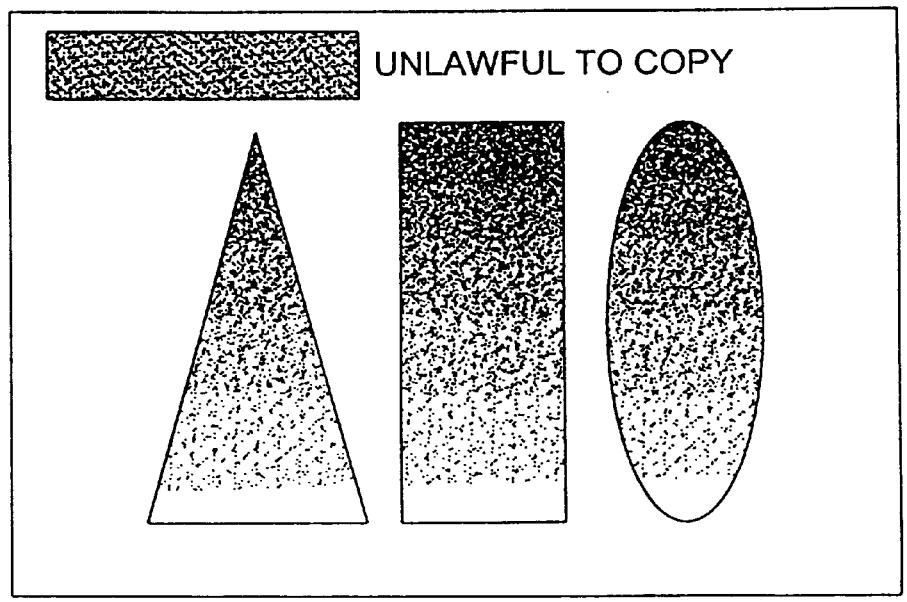
FIG. 21 gives an example of the final output of the printer.

FIG. 20 shows a case in which the image data beyond the point where mark $M_2$ is detected have been transformed into a specified pattern. Every part of the document which is output beyond mark $M_2$ is covered over with this pattern. In FIG. 21, the image data are altered to gradually decrease the density of the portion of the image beyond mark $M_2$. The image in the copy gradually gets lighter until it disappears.

Figure 22:
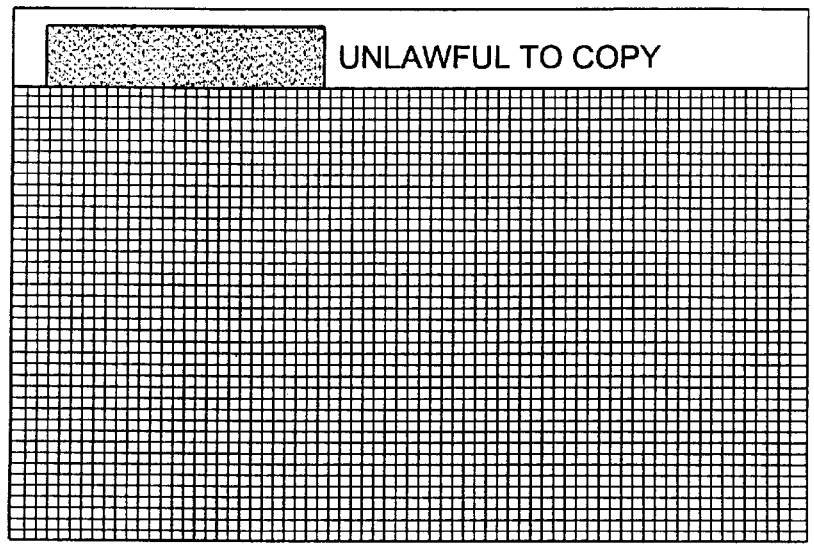
FIG. 22 gives an example of the final output of the printer.
Figure 23:
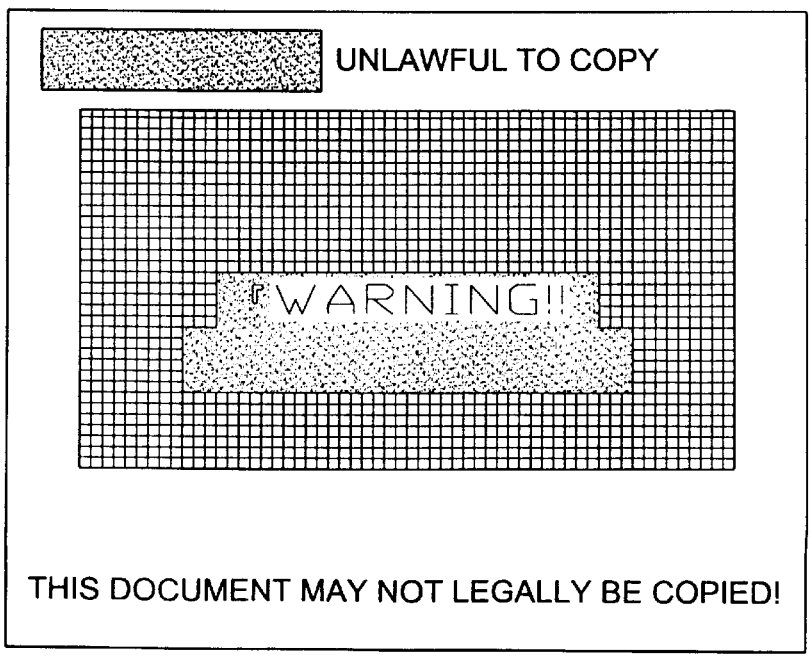
FIG. 23 gives an example of the final output of the printer.
Figure 24:
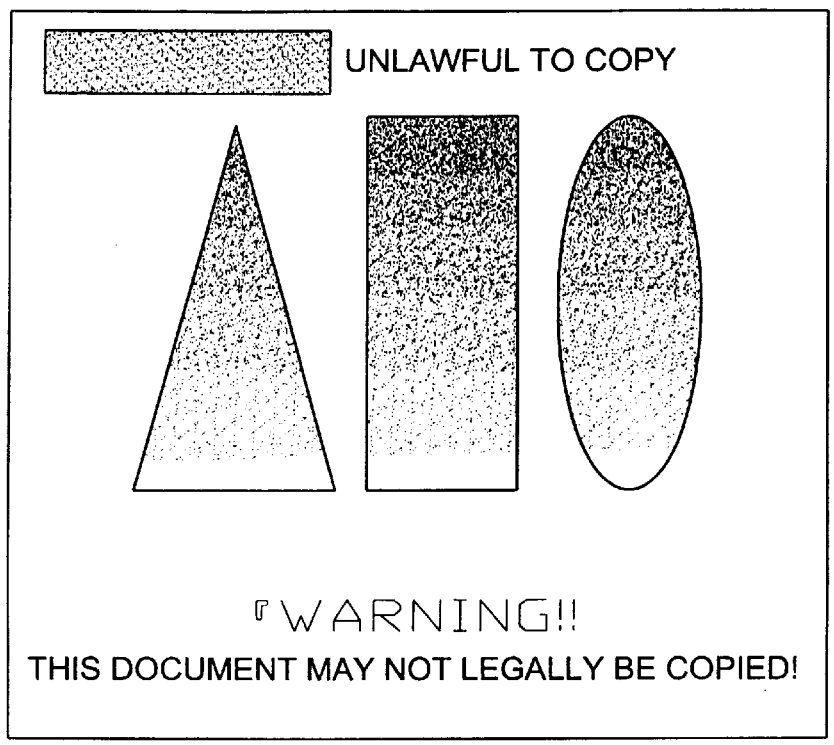
FIG. 24 gives an example of the final output of the printer.

FIGS. 22 through 24 give examples in which printer control unit 21 in control device 2 or print control unit 24 in printer 3 supplements the altered data with additional image data before the copy is output. In the example shown in FIG. 22, the margin of the document has also been printed with a cover pattern. In the example in FIG. 23, a specified warning has been printed over the covered portion of the image. In the example in FIG. 24, the print in the image gradually gets lighter just as in FIG. 21, and a warning is printed in the margin.

Figure 25:
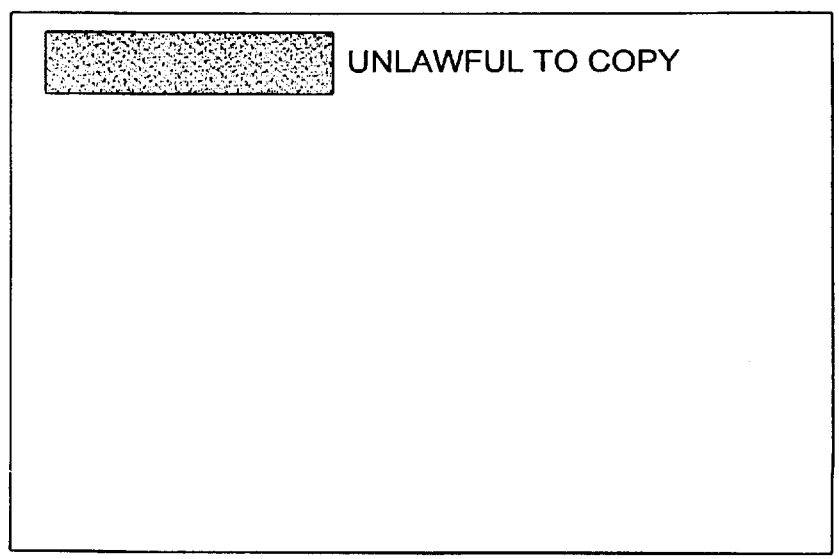
FIG. 25 gives an example of the final output of the printer.

FIG. 25 is an example of a copy output by an embodiment with the aforesaid detection device $R_3$ (FIGS. 14, 16, 18 and 19). The printing of the image is interrupted when mark $M_2$ is discovered, and the rest of the document remains blank.

Figure 26:
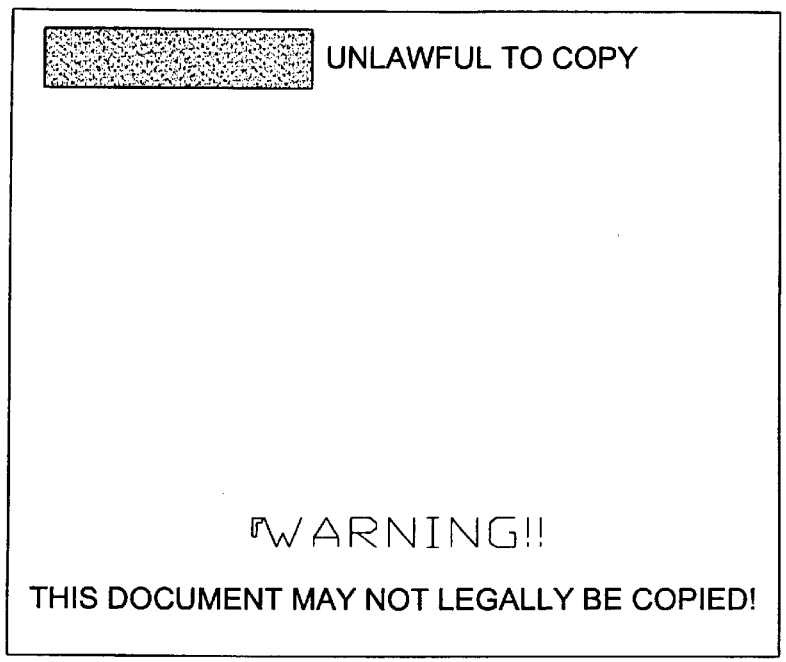
FIG. 26 gives an example of the final output of the printer.

In this case, too, as is shown in FIG. 26, a warning may be printed in a specified location on the copy.

Like device $R_1$, the aforesaid pattern detection devices $R_2$ and $R_3$ have line memories corresponding to the size of mark $M_2$. If the image data are delayed in these line memories before being output, the output of the image data containing mark $M_2$ can be controlled.

In the image processing systems described above, devices $R_1$ through $R_3$, which have a specified circuit pattern, are built into existing circuitry in one of the system devices. This design significantly reduces the labor and cost required to develop a system. If the user is free to store any desired reference pattern in the reference memory in detection unit PT, he can freely designate or change the document to be prohibited.

This image processing system consists of three general purpose devices, image scanner 1, control device 2 and printer 3, which are connected together. It would be easy, then, to disable the system by removing the device (for example, the image scanner) with the detection unit and substituting another device without such a unit.

To address this problem, the image processing system has the control unit for every device in the system verify, at the time the system starts up, that the device or some other system device has a pattern detection unit. If a control unit recognizes that there is no detection unit, it orders that the operation of the device be halted.

Figure 27:
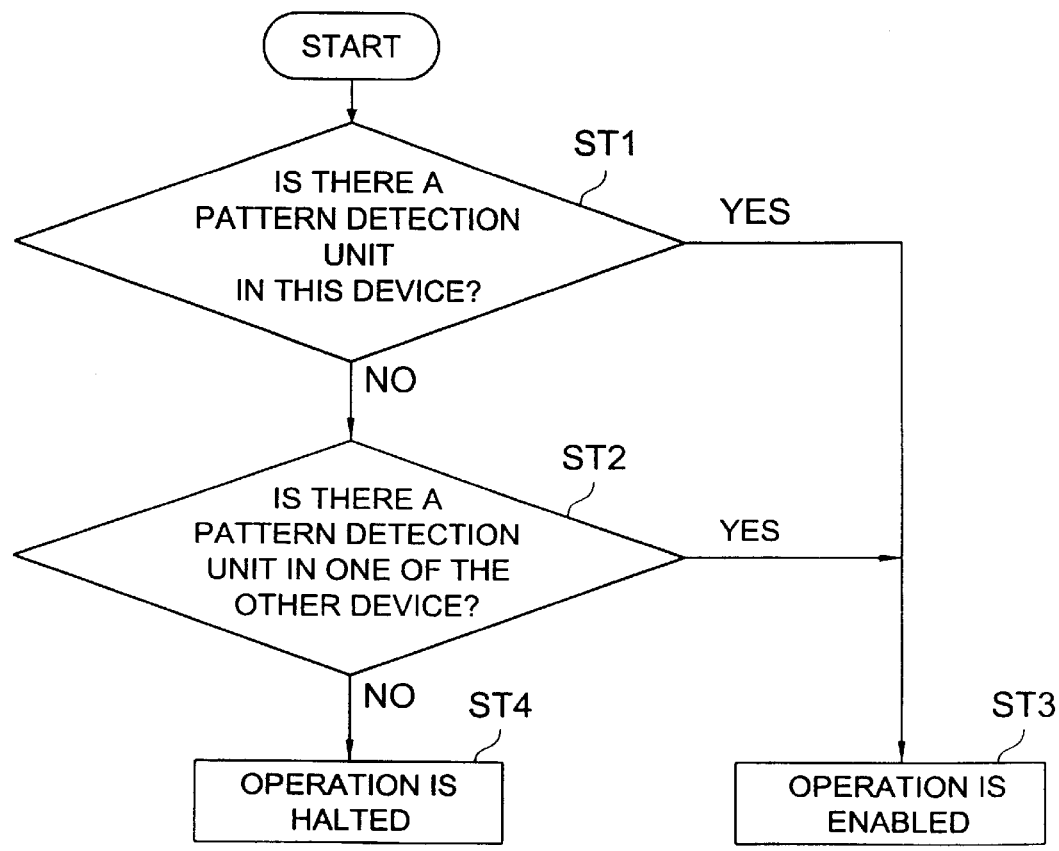
FIG. 27 is a flow chart of the processing executed by the control unit for each device when the system starts up.
Figure 28:
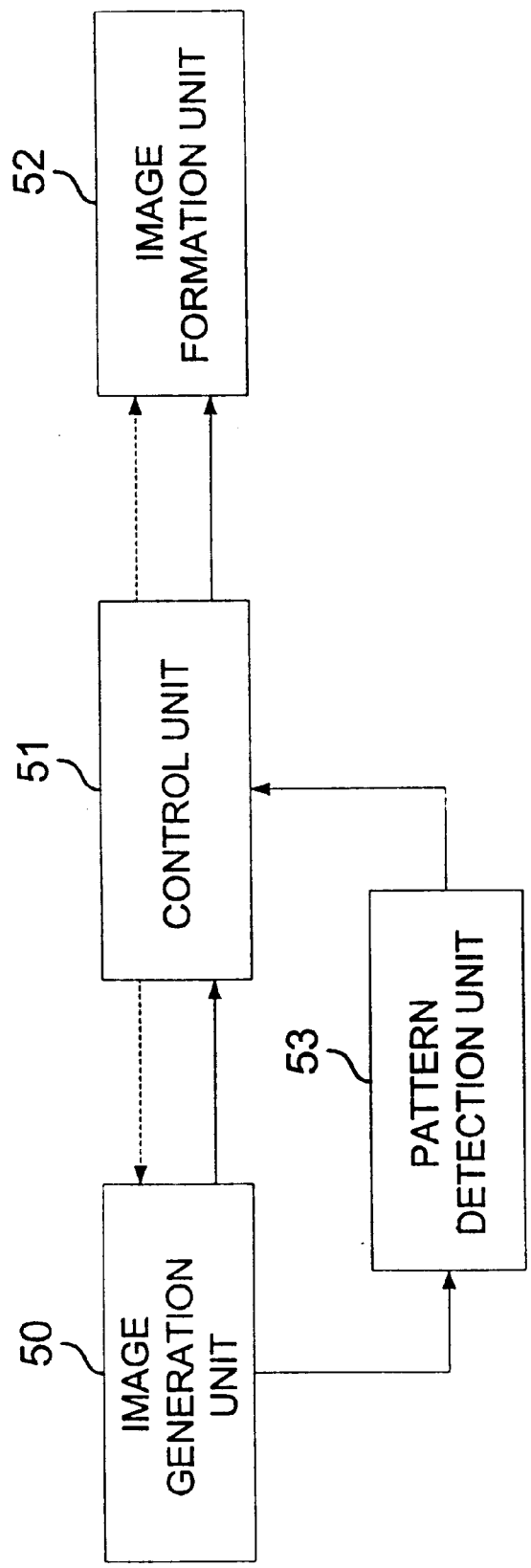
FIG. 28 is a block diagram of a dedicated copying device.

FIG. 27 shows the control operation executed by the control unit for each device when the system starts up.

Every control unit checks in Step 1 whether its device has a pattern detection unit. If the answer is "no", it checks in Step 2 whether any other device has a detection unit.

If the devices are connected by an SCSI bus, they can be checked successively in the order of their ID numbers. If they are connected by a LAN circuit, all the devices can be checked simultaneously.

If the answer in Step 1 or Step 2 is "yes", the control unit for each device starts up its main program to render it operable (Step 3). If the answer is "no" in Steps 1 and 2, each control device executes processing to halt operation and control device 2 outputs an audio warning (Step 4).

In the embodiments described above, when it is determined that there is no detection unit in any of the devices, the operation of each device is interrupted. Alternatively, the devices themselves may be allowed to operate while only the input or output of image data is halted.

In the embodiments discussed above, we assumed that the document reproduction system consisted of image scanner 1, control device 2 and printer 3. This invention, however, is not limited to the aforesaid system only. It could be applied in any system consisting of interconnected devices to input, output and process image data.

For example, a storage device such as a hard disk, a floppy disk or a CD driver can be connected to two or more control devices. If any of these storage or control devices has a pattern detection unit and someone tries to make a copy of a storage medium on which image data are stored, any image data marked with the specified pattern can be prevented from being copied.

If there is a detection unit in one of the devices in a system in which a modem is connected to a control device to transmit image data read by a scanner, it will not be possible to transmit image data representing specified documents.

This invention, then, can be applied in any commonly used computer system, where it will simply and reliably prevent the reproduction of image data associated with specified documents.

In some embodiments of the present invention, the pattern detection processing is executed on color image data synthesized by successively combining image data for each color signal. In this way the output of specified color image data can be controlled.

In other embodiments of the present invention, if the function of detecting the pattern or controlling the data output is absent, the system is partially or completely halted. This will make it impossible to output the image data of specified documents even if the device providing the pattern detection or control function is removed from the system.

What is claimed is:

1. An image processing method for processing an input color image data and detecting a specified pattern in said input color image data, said input color image data having a plurality of color signals input successively, said method comprising the steps of:

storing said input color image data temporarily in a first memory unit and outputting portions of said stored input color image data after a delay and when said first memory unit becomes full, whereby said first memory unit functions as a buffer memory;

storing said input color image data in a second memory unit, said storing steps being performed in parallel;

matching said stored input color image data in said second memory unit against at least one reference pattern to detect said specified pattern during said delay; and outputting a matching result based on a result of said matching step.

2. The image processing method of step 1, further comprising the step of controlling the outputting of said portions of said stored input color data from said first memory unit based on said output matching result.

3. The image processing method of step 1, wherein said input color image data comprises a plurality of pixel data sets, each pixel data set being sequentially input into said first and second memory units and matched against a reference pixel set, said method further comprises the steps of:

obtaining a respective matching result for each pixel set; and controlling the outputting of said portions of said stored input color data from said first memory unit based on a combination of said matching results.

4. The image processing method of step 1, wherein said first memory unit has a buffer size suitable to store image data comprising at least said specified pattern and to delay outputting portions of said stored input color image data, whereby an entire image of said input color image data comprising said specified pattern is prevented from being output from said first memory unit.

5. An image processing device for processing an input color image data and detecting a specified pattern in said input color image data, said input color image data having a plurality of color signals input sequentially, said device comprising:

a first memory unit for temporarily storing said input color image data and outputting portions of said stored input color image data after a delay and when said first memory unit becomes full, whereby said first memory unit functions as a buffer memory;

a second memory unit for storing said input color image data in a pattern detection unit, said first and second memory unit storing said input color image data in parallel; and a matching unit for matching said stored input color image data in said pattern detection unit against at least one reference pattern to detect said specified pattern during said delay, and to output a matching result.

6. The image processing device of claim 5, wherein said matching unit controls the outputting of said portions of said stored input color data from said first memory unit based on said matching result.

7. The image processing device of claim 5, wherein said input color image data comprises a plurality of pixel data sets, each pixel data set being sequentially input into said first and second memory units, wherein said matching unit matches each input pixel set to a respective reference pixel set, obtains a respective matching result for each pixel set, and controls the outputting of said portions of said stored input color data from said first memory unit based on a combination of said matching results.

8. The image processing device of claim 5, wherein said first memory unit has a buffer size suitable to store image data comprising at least said specified pattern and to delay outputting portions of said stored input color image data, whereby an entire image of said input color image data comprising said specified pattern is prevented from being output from said first memory unit.

9. A control device capable of detecting a specified pattern in an input image, said control device comprising:

an image processing device for processing said input color image data and detecting said specified pattern in said input color image data, said input color image data having a plurality of color signals input sequentially, said image processing device comprising:

a first memory unit for temporarily storing said input color image data and outputting portions of said stored input color image data after a delay and when said first memory unit becomes full, whereby said first memory unit functions as a buffer memory;

a second memory unit for storing said input color image data in a pattern detection unit, said first and second memory unit storing said input color image data in parallel; and a matching unit for matching said stored input color image data in said pattern detection unit against at least one reference pattern to detect said specified pattern during said delay, and to output a matching result.

10. A printer capable of detecting a specified pattern in an input image, said printer comprising:

an image processing device for processing said input color image data and detecting said specified pattern in said input color image data, said input color image data having a plurality of color signals input sequentially, said image processing device comprising:

a first memory unit for temporarily storing said input color image data and outputting portions of said stored input color image data after a delay and when said first memory unit becomes fill, whereby said first memory unit functions as a buffer memory;

a second memory unit for storing said input color image data in a pattern detection unit, said first and second memory unit storing said input color image data in parallel; and a matching unit for matching said stored input color image data in said pattern detection unit against at least one reference pattern to detect said specified pattern during said delay, and to output a matching result.

11. A scanner capable of detecting a specified pattern in an input image, said scanner comprising:

an image processing device for processing said input color image data and detecting said specified pattern in said input color image data, said input color image data having a plurality of color signals input sequentially, said image processing device comprising:

a first memory unit for temporarily storing said input color image data and outputting portions of said stored input color image data after a delay and when said first memory unit becomes full, whereby said first memory unit functions as a buffer memory;

a second memory unit for storing said input color image data in a pattern detection unit, said first and second memory unit storing said input color image data in parallel; and a matching unit for matching said stored input color image data in said pattern detection unit against at least one reference pattern to detect said specified pattern during said delay, and to output a matching result.

* * * * *